March 12, 1940.  G. C. GEORGE  2,193,170
REFRIGERATING SYSTEM
Filed Jan. 5, 1939  5 Sheets-Sheet 1
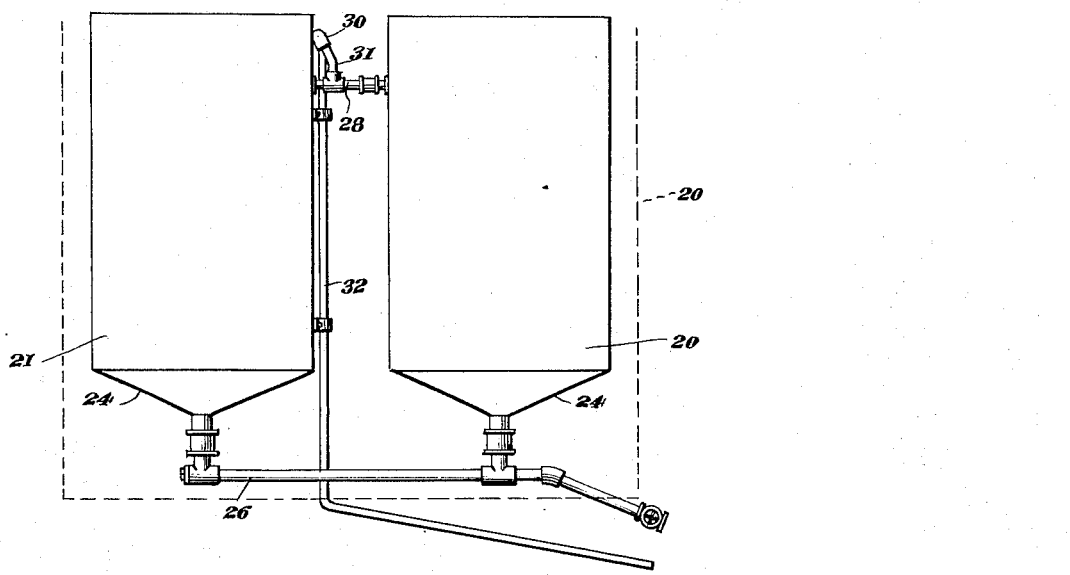
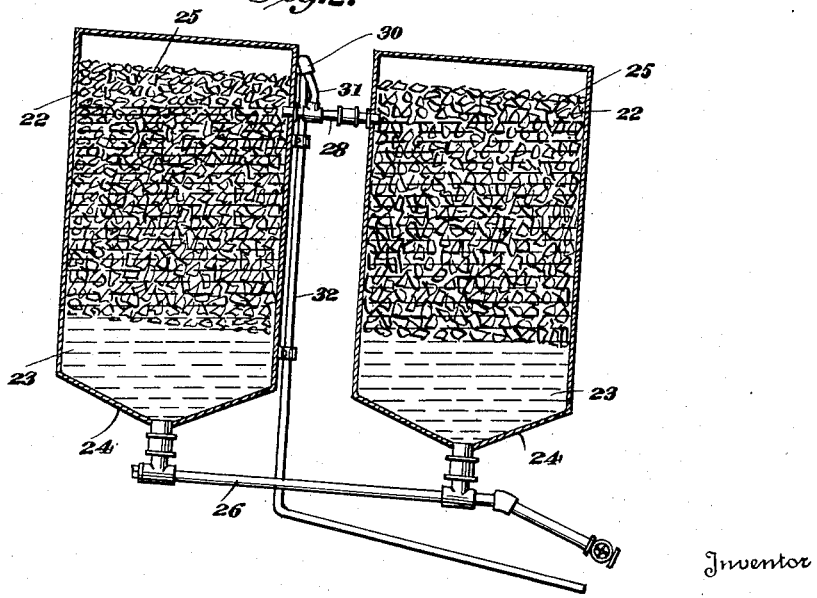
Inventor
GLENN C. GEORGE March 12, 1940.  G. C. GEORGE  2,193,170
REFRIGERATING SYSTEM
Filed Jan. 5, 1939   5 Sheets-Sheet 2
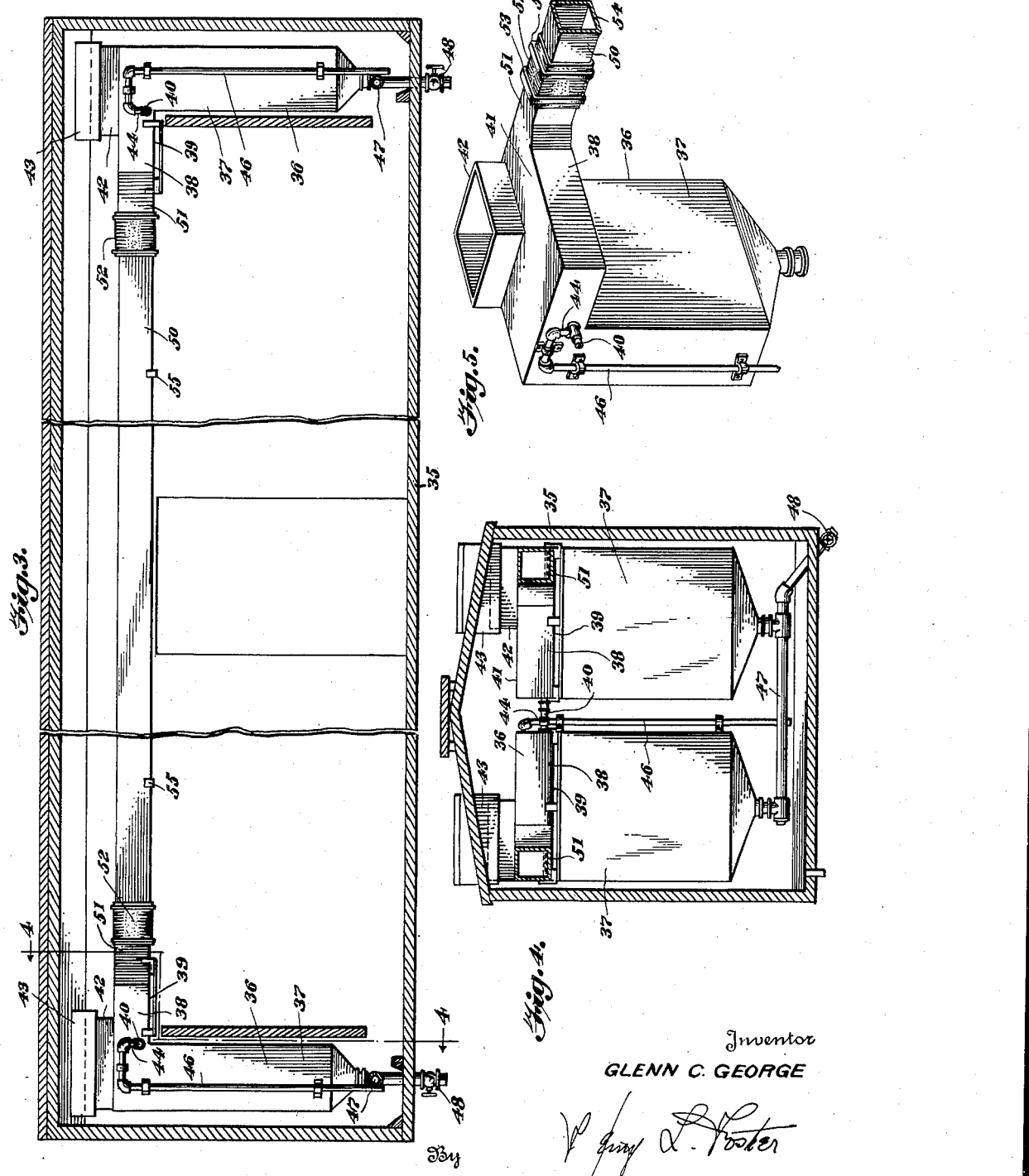

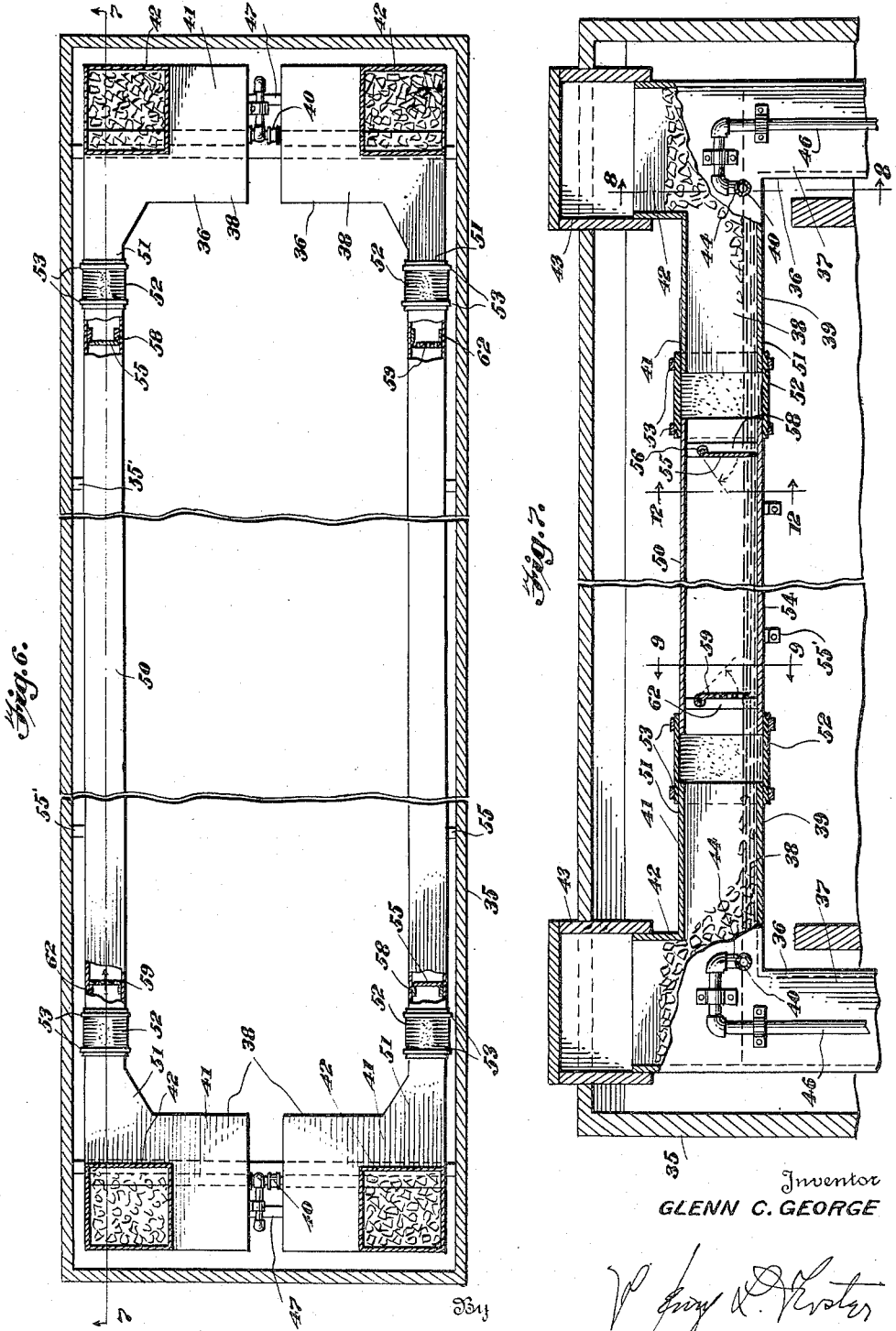

March 12, 1940.   G. C. GEORGE   2,193,170
REFRIGERATING SYSTEM
Filed Jan. 5, 1939   5 Sheets-Sheet 4
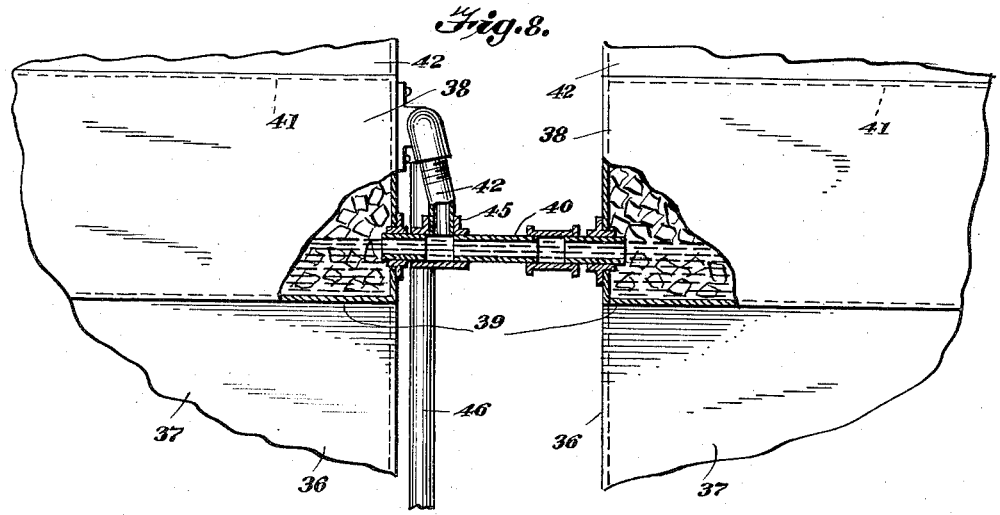
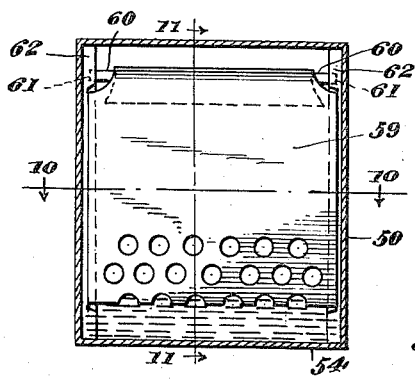
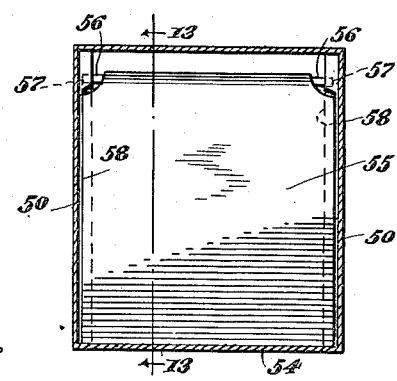
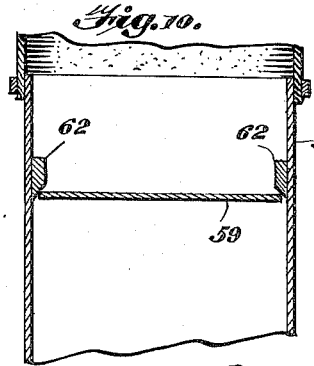
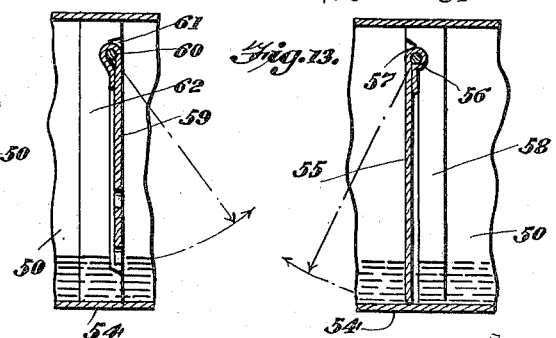
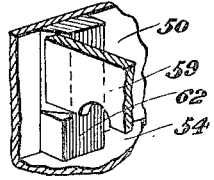
Inventor
GLENN C. GEORGE

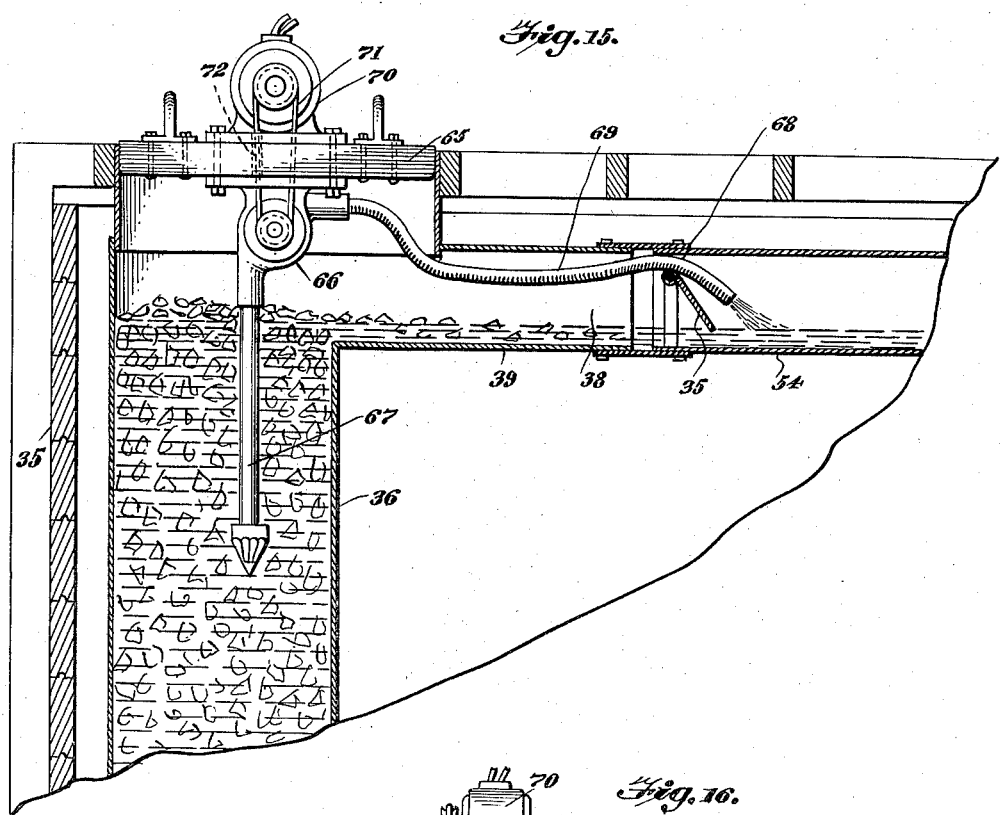
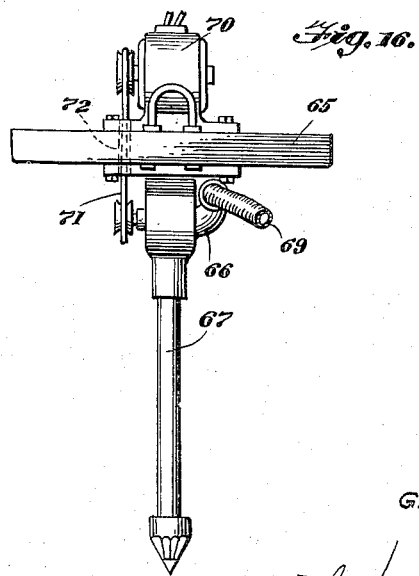

Patented Mar. 12, 1940

2,193,170

UNITED STATES PATENT OFFICE 2,193,170

REFRIGERATING SYSTEM

Glenn C. George, Omaha, Nebr.

Application January 5, 1939, Serial No. 249,540

17 Claims. (Cl. 62—19)

This invention relates to refrigerating systems for refrigerator cars, road, and other vehicles, and more particularly to systems that use ice as the refrigerant. While the system will be described for use in freight cars, it is obvious that it may be used in other vehicles without modification except in size, and the word "car" as used in the claims is to be interpreted in its broadest sense as including other types of vehicles.

In such systems it is common to use vertical tanks arranged at the end of a car for containing ice and brine, the brine being maintained at a low temperature by the melting ice, which is maintained more or less submerged in the brine, and the brine absorbing heat from the interior of the car through the walls of the tank. When a car that is cooled by such a system is used in a haul of any great distance, it becomes necessary to reice the car from time to time as the ice in the tanks melts away. The reicing process involves the removal of a portion of the brine from the tanks to make space for the new charge of ice.

In order to maintain efficient refrigeration, it is desirable that there be sufficient brine in the tanks at all times to cover substantial portions of the heat absorbing surfaces that are exposed to the refrigerated cargo space, and therefore it is highly desirable that there be some means of insuring that the level of the liquid within the tanks shall not fall below a given minimum that will provide efficient refrigeration. In a tank of a given size, when a given amount of ice is introduced, a definite volume of liquid is required to provide a liquid level of the proper height to give efficient refrigeration.

In addition to maintaining a minimum liquid level to insure efficient refrigeration, it is also important to provide means for keeping the liquid below a maximum level. If the liquid rises to a point too near the tops of the tanks, it may overflow, or be slopped over, and get into the cargo space where it may spoil or damage the cargo, and as brine is very corrosive, if it comes into contact with the car, the latter may be seriously damaged. Brine that escapes from the tanks will also drip to the right of way. Brine has been found to be so destructive to steel track and equipment that the rules of the Association of American Railroads (rule 3, paragraph R-2) prohibit permitting brine to drip on the right of way, and a carrier may refuse to accept for transportation a car that is dripping brine.

In charging an empty tank, satisfactory results may generally be obtained by introducing a definite volume of ice and a definite quantity of liquid, but where a car is reiced after an ice charge has melted, it is very difficult to fix the liquid level at the proper point. It is possible to withdraw a quantity of liquid from the tanks by means of the drain valves with which such tanks are usually provided, but such a procedure is not practical because it involves measurement of the quantity of liquid withdrawn, or measurement of the liquid within the tanks, and closing the valves at the proper time. Such an operation is impractical for several reasons. It requires constant attention during the draining period and considerable care in controlling the draining. Since unskilled and often careless labor is usually employed in reicing, sufficient care will often not be used. It is extremely difficult to accurately guage the depth of liquid within the tanks, and entirely impractical to do so after the ice has been added, and, in order to save time in reicing a train, the ice is ordinarily added at the earliest moment possible, and usually before a draining operation can be performed. When it is considered that in fast refrigerated freight service the periods allowed for reicing often are as short as one or two minutes, the difficulty of adjusting the quantity of liquid within the tanks will be apparent.

An overflow connected with the tanks at the proper level for efficient refrigeration will serve to adjust the level of the liquid when the tank is charged, but will not maintain such level because of the escape of the liquid during motion of the car. Such an arrangement will permit brine to drip on the right of way or into the cargo space, either because of overflow due to the melting of the ice or to the slopping over of the liquid under the influence of the swaying and lurching to which a freight car is subjected. It has been proposed to use tanks for receiving liquid from such overflows, but they are not satisfactory, because they require the use of valves to empty them, and valves require too much time to operate and are subject to difficulty of operation by reason of clogging with foreign matter, and they deteriorate rapidly under the action of brine to which they are constantly subjected. In the rush of reicing, the draining of such tanks is often overlooked, and consequently the ice tank will overflow when the auxiliary tank is full.

Another defect of ice and brine systems that have been used is that, due to the arrangement of the tanks at the ends of the cars, where they are placed to leave a clear cargo space, the cargo space is not efficiently cooled, particularly the central portion which is a relatively great distance from the tanks. Since standard refrigerator cars equipped with brine and ice tanks have 30 or 40 feet of cargo space, the central portion of such space is generally 16 or more feet from the walls of the tanks. As a high head of ice is necessary for efficient refrigeration, particularly when the commodity is laterally spaced from the tank, and as the height of the tanks in refrigerator cars is limited, it is apparent that the refrigeration of the central portions of such a car is faulty.

One object of the present invention is to provide novel means for adjusting the liquid level within ice and brine tanks of refrigerator cars, such means operating automatically when a charge of ice is introduced into the tanks.

Another object is to provide such a novel arrangement of liquid level adjusting means that the liquid level will after the adjustment remain substantially constant without further withdrawal of liquid during the melting of the ice charge.

Another object is to provide such means that avoid the use of valves, yet will prevent escape of liquid from the tanks during motion of the car between charging operations.

Still another object of the invention is to provide a novel tank structure that a large proportion of the ice charge will be maintained near the top of the tank, and the ceiling of the car, to provide a high head of ice.

A further object is to provide such a novel tank that will permit use of a relatively short car, yet which will provide a relatively large cargo space.

A still further object is to provide such a tank having a novel arrangement whereby the high head of ice will be relatively close to the central portion of the cargo space.

Another object is to provide a novel refrigerating system wherein a circulation of cold brine may be maintained about the periphery of the cargo space, and novel means for setting up and maintaining such circulation.

Still another object is to provide a novel method for precooling a refrigerating car, and novel means for carrying out such method.

The specific gravity of ice is approximately 0.92, and ice floats in water with about nine-tenths of its volume submerged and one-tenth above water. If a straight-sided tank is charged solidly with ice to its top, upon complete melting of the ice, the water level will be at approximately nine-tenths of the height of the tank. If a tank is charged to its top with a mixture of ice and water, in such quantity and proportions that the water is level with the top of the tank and the ice floats free of the bottom, the ice will float with approximately one-tenth of its volume above the top of the tank, and as it melts, the reduction in its volume will just compensate the volume of the ice that floated above the top of the tank, leaving the water constant during the melting period and at the same level. If, however, the tank is so charged with ice and water that the ice rests on the bottom and a quantity is supported above the top of the tank, the reduction in volume as the ice melts will not compensate for the volume of the ice above the top, and during melting the tank will overflow.

Taking advantage of this characteristic of ice, I have provided a refrigerating ice and brine tank with means for fixing the liquid level at the time of charging the tank, at a point spaced above the bottom of the tank a distance equal to at least nine-tenths of the height of the tank, so that, as long as the ice charge within the tank floats free of the bottom, the liquid level will not be altered during the melting of the charge.

For the purposes of a system of the type herein described, ice may be assumed to float in the brine that is used with nine-tenths of its volume submerged. The character of the system is such as to allow ample variation of density of the brine without interfering with the operation of the system. The system also provides for variations in the volume of the ice charges, so that over or undercharging will not interfere with its operation.

The level of the liquid in the tanks is, according to the invention, adjusted at the time of charging by a siphon that has an intake at the proper level within the tanks, the highest point of the siphon being at a level that is lower than the tops of the tanks, so that when a charge of ice is introduced, the level of the liquid within the tanks will be raised sufficiently to start the siphon, which will continue to operate until the liquid has been lowered to the proper level. While a siphon located at any lateral point of a tank will serve to adjust the level of the liquid within the tank, it is preferable that the siphon be arranged substantially upon the longitudinal center of the car. Similarly, while a single tank extending transversely of the car, and provided centrally with a siphon, may be used, it is preferable to employ tanks that are spaced on opposite sides of the longitudinal center of the car and connected by a transverse tube arranged upon the proper level of the liquid, and to connect the siphon with the tube.

Preferably the tanks are arranged to receive definite charges of ice, and are of sufficient depth to permit the charges to float free of the bottoms of the tanks with the tops of such charges below the tops of the tanks, and the intake of the siphon is arranged on a level sufficiently high to provide a great enough depth of liquid to float the charges.

In the accompanying drawings:

Figure 1 is an elevation of a pair of tanks arranged in a preferred manner and provided with a siphon in accordance with this invention.

Figure 2 is a vertical section through the tanks of Figure 1, the tanks being shown in tilted position, and the figure illustrating the level of the liquid in the respective tanks under such condition.

Figure 3 is a longitudinal section of a refrigerator car equipped with a refrigerating system that embodies the different features of the invention.

Figure 4 is a sectional view on line 4—4 of Figure 3.

Figure 5 is a perspective view of one of the ice and brine tanks of the system.

Figure 6 is a horizontal sectional view of a car showing the system in plan.

Figure 7 is a sectional view on line 7—7 of Figure 6.

Figure 8 is an enlarged fragmentary vertical section showing in detail the connections of the siphon with the tanks.

Figure 9 is a sectional view on line 9—9 of Figure 7.

Figure 10 is a sectional view on line 10—10 of Figure 9.

Figure 11 is a sectional view on line 11—11 of Figure 9.

Figure 12 is a sectional view on line 12—12 of Figure 7.

Figure 13 is a sectional view on line 13—13 of Figure 12.

Figure 14 is a fragmentary perspective view showing details of the mounting of a gate that is used to control circulation of the liquid in the system.

Figure 15 is a vertical section of a portion of the system illustrating a method of precooling the system and showing in elevation a device for accomplishing such precooling.

Figure 16 is an end elevation of the precooling device.

Describing the drawings more particularly, and referring first to Figure 1, the walls of a refrigerator car are indicated at 20. Spaced laterally upon opposite sides of the longitudinal center of the car are upstanding ice and brine tanks 21, the tanks being of such dimensions that they will receive an ice charge, shown at 22 in Figure 2, of a given volume, and sufficient liquid 23 to float the ice above the bottoms 24 of the tanks. The tanks are sufficiently high that the top portions 25 of the ice charges that float above the liquid are below the level of the tops of the tanks. The bottoms 24 of the tanks are hopper-shaped, and are connected with a drain pipe 26 that leads to a convenient point where it is provided with a drain valve 27.

In order to provide for adjustment of the level of the liquid within the tanks at the time that a charge of ice is added, the tanks are connected by a pipe 28 that is of relatively small diameter, and arranged at such a height above the bottoms of the tanks that the required level of the liquid passes through its interior. A siphon, designated generally 30, has its intake arm 31 connected with the pipe 28 and opens into the interior of such pipe at the required level. In the embodiment illustrated, the intake arm 31 opens through the upper wall of the pipe, and the inner surface of such wall is upon the level at which the liquid is to be fixed when the tank is charged. The siphon 30 has a discharge arm 32 that extends downward and leads to a convenient point of discharge, generally at the side of and below the floor of the car. The highest point of the siphon lies below the tops of the tanks so that liquid will flow through the siphon before the tanks will overflow.

A car that is being iced is usually level, and therefore the depth of liquid in the respective tanks at such times will be equal. When charges of ice are placed in the tanks, such charges will displace quantities of brine present in the tanks from the preceding charge, the volume of such displaced liquid being equal to approximately nine-tenths of the volume of the new charges of ice. This displacement will cause the liquid to rise in the tanks 21 and the intake arm 31 of the siphon, until the highest point of the siphon is reached, at which time the liquid will pass into the discharge arm 32 and start the siphoning action. When the siphoning action has been thus started automatically by the insertion of the ice charges into the tanks, it will continue until the level of the liquid has fallen sufficiently to permit air to pass into the tube 28 to the intake of the siphon, which will break the siphoning action. As the intake lies upon the required level, the liquid remaining in the tanks will then be at the proper level.

As described above, the tanks are of sufficient depth to receive the ice charges and enough liquid to float them free of the tank bottoms. The pipe 28, in order to fix the liquid level when the tanks are charged, at a point where it will remain constant during the melting of the charges, is arranged at a point spaced above the bottoms of the tanks a distance equal to at least nine-tenths of the height of the tanks, so that when the ice charges are floating in the tanks, the intake of the siphon will be at a point about nine-tenths of the height of the charges above their bottoms. When the liquid has been reduced to such a level, the reduction in volume of the charges during melting will compensate for the volume of ice that floats above the level of the liquid, and the liquid level will remain substantially constant during the melting.

The arrangement of the spaced tanks 21 and the coupling pipe 28, to which the siphon is connected, is regarded as preferable, because in such an arrangement the siphon is guarded from surges. Since there is a relatively small body of liquid within the pipe 28, and since the intake arm 31 is vertically disposed and enters the pipe through its top, the liquid will not splash in the intake arm to a sufficient height to pass over the high point of the siphon. The intake of the siphon is also guarded against entrance of liquid due to fore and aft surges of the liquid in the tanks.

The siphon is also guarded against escape of liquid by reason of transverse surges caused by side sways of the car. Figure 2 illustrates that when the liquid in the tanks is level with the top inner surface of the pipe 28 when the car is level, side sway, for example to the right as illustrated, will cause the liquid adjacent the right walls to rise. Thus the liquid that is at the left wall of the right tank will be lower than the pipe 28, while the liquid at the right wall of the left tank will be higher than the pipe. This will cause liquid to flow from the left tank to the right tank, but there will not be sufficient head of liquid in the left tank to start the siphon, and the open pipe will permit the liquid to flow freely into the lower tank. A side sway is of such brief duration that usually such a condition will have passed before the levels are adjusted. If the car stands in a tilted position, the liquid will flow from the upper to the lower tank until the levels in the two tanks are adjusted or the level of the higher tank has fallen below the opening of the pipe 28.

The intake arm 31 of the siphon is of such great height in relation to its internal diameter that even though the liquid rises into such arm, it will not be subjected to any such violent motion as would cause it to splash over the high point of the siphon to the discharge, and the intake arm is of such height as to provide an ample margin of safety against overflow by reason of either motion of the car or of overcharging the tanks with ice. The small diameters of the pipe 28 and the intake arm 31 prevent the relatively large bodies of liquid in the tanks from exerting sufficient pressure upon the liquid adjacent the intake arm to cause the liquid to overflow.

The above-described means for fixing and maintaining the liquid level within refrigerating ice and brine tanks may advantageously be combined with a system arranged as shown in Figures 3 to 15.

In these figures, a freight car 35 is provided at each of its ends with a pair of tanks 36, arranged adjacent the sides of the car and spaced laterally upon opposite sides of the longitudinal center of the car. The tanks 36 are of a specialized form to provide for maintaining the ice at a high level in the car, and to provide efficient refrigeration by limiting the distance between the central portion of the car and the refrigerating surfaces of the tanks.

To these ends, the tanks are arranged in the form of inverted L's, each comprising a lower, straight-sided portion or arm 37, and an upper, horizontal arm or enlarged head 38 that extends longitudinally from the arm 37 toward the center of the cargo space. The enlarged heads 38 have substantially flat bottom walls 39 that overlie portions of the cargo space, and since the lower faces of these bottom walls constitute refrigerating surfaces, they provide efficient refrigeration by reason of their high position and proximity to the central portion of the car.

The paired tanks 36 at the ends of the car are connected together as previously described by a relatively small horizontal pipe 40, arranged at a level spaced above the tank bottoms a distance equal to at least nine-tenths of the height of the tanks, and its upper wall being arranged upon the level at which it is desired to maintain the surface of the liquid within the tanks. The size of the tanks is so calculated as to receive a definite charge of ice, floating free of the bottoms, and the liquid level is fixed at a point to provide sufficient depth of liquid to float such charges. The bottoms 39 of the enlarged heads are arranged upon a level slightly lower than the level at which the surface of the liquid is to be maintained. This is to provide for a body of brine, cooled by the melting ice, and overlying the bottom walls 39 so that efficient refrigeration will be provided by such walls.

The tanks 36 are closed by top walls 41 that extend to form tops for the enlarged heads 38, and that prevent escape of ice or brine over the tops of the sidewalls of the tanks. Hatchways 42 in the top walls 41 are in communication with filling hatches 43 in the roof of the car.

To reduce the level of the liquid in the tanks to the proper point when the tanks are charged, an intake arm 44 of a siphon opens into the pipe 40 at a point substantially upon the longitudinal center of the car. As shown in detail in Figure 8, the intake 45 of the siphon arm 44 is at the level of the upper inner surface of the pipe 40. The siphon arm 44 forms an element of a U-shaped siphon, the highest point of which is below the level of the tops of the tanks, and the other arm 46 of which acts as a discharge pipe and leads to a convenient point of discharge.

The enlarged heads do not interfere with the operation of the siphons, or the maintaining of the liquid level in the tanks, as described above in connection with straight-sided tanks. Since the depth of liquid to the desirable level above the bottoms is sufficient to float the ice charges in the tanks, the liquid level will remain constant during the melting of the charges, and upon introduction of a fresh charge the siphon will operate to reduce the liquid to the correct level. The height of the siphon above the intake is so selected that the introduction of a charge of the predetermined volume will raise the level of the liquid remaining from a preceding charge enough to start the siphon. The siphon is guarded against accidental operation or escape of liquid by reason of the small size of the passages in the intake arm 45 and in the pipe 40. A drain pipe 47 is connected with the bottoms of the tanks, and such pipe is controlled by a valve 48.

In tanks of this form, when the ice charge is added to the liquid, the siphon starts automatically and the liquid is lowered to the proper level. Since the liquid level is above the bottoms 39 of the enlarged heads 38, the tops of the charges of crushed ice, which are above the liquid level, will be broken up by the motion of the car and will spread into the enlarged heads. This will not only serve to place the ice closer to the refrigerating surfaces of the bottoms 39 and thereby improve refrigeration, but the progressive disintegration of the tops of the ice charges will result in the gradual raising of the charge, and the entire charge will therefore float at a higher level in relation to the cargo space than the level at which it would float if it were maintained in a column by a tank having straight sides throughout its height. As is well known in the art of refrigeration, it is advantageous to maintain the refrigerant at a high level since cold air travels downwardly, and such an arrangement as that described provides for short and direct downward travel of cold air to a large part of the cargo space. The enlarged heads also serve the valuable purpose of decreasing the distance between the central portion of the car and a refrigerating surface, thereby reducing the distance that the cold air must travel from such surface and increasing the rapidity of air circulation, whereby a low and uniform temperature of the air is maintained.

To still further increase the efficiency of a refrigeration system of this kind, tubular refrigerating members that extend longitudinally of the car and connecting the tanks at the respective ends of the car may be employed. These members advantageously take the form of rectangular tubes 50 that extend along the top portions of the side walls of the car between the enlarged heads 38 of the tanks upon that side. To provide connections for the members 50, the heads 38 may have extensions 51 that form nipples to which the tubular structures 50 are connected by flexible couplings 52. Retaining straps 53 may be used to tighten the couplings. The bottoms 54 of the members 50 are level with the bottoms 39 of the enlarged heads 38, and the members may be supported centrally by brackets 55 attached to the sides of the car.

It will be seen that the tubular members 50, the tanks 36, and the connections 46 and 47, provide a circuit so arranged that the level at which the liquid is maintained lies within the members 50. As the car lurches axially and sways laterally, the liquid in the system surges through the tubular members. In order to provide for circulation of the liquid through the circuit, so that cold brine and ice will be constantly present at all points, the tubular members 50 are provided with means for controlling the passage of surges through them. Such means are so arranged that crushed ice may be carried into the tubular members from either end of the car, but is kept within the members after having entered, and serves to aid in maintaining a uniform temperature of the brine that circulates through the system.

These results are accomplished by mounting inwardly swinging gates within and adjacent the ends of the tubular structures 50. Each tube has a solid gate 55 at one of its ends, such gates being in the form of metal plates mounted respectively upon horizontal pivot pins 56 that extend transversely of the tubular members and the ends of which are pivotally mounted in recesses 57 in carrier plates 58 that extend vertically along the inner surfaces of the members 50. The pivot pins 56 and gates 55 are so arranged that the gates swing from the edges of the plates 58 toward the center of the members 50, and the edges of the plates act as stops to prevent the gates from swinging outwardly toward the ends of the tubular members. The gates 50 are of proper length to engage the surfaces of the bottom walls 54 of the members 50 and substantially close off such members against flow of liquid toward the ends adjacent which the gates are mounted. The members 50 have the gates 55 mounted at their respective opposite ends, so that liquid may pass through such members only in opposite directions. In this manner surging of the liquid is limited to directions in the respective tubes that will result in motion of the liquid about the circuit provided by the tubes and the tanks. Since the gates 55 swing freely inward, ice may be carried past them into the interiors of the tubular members by the surging liquid.

To permit liquid and ice to surge into the tubular structures 50 from the ends opposite to those in which the gates 55 are mounted, and to permit the liquid to flow from the same ends, while maintaining the ice within the tubular members, perforated gates 59 are provided at the other ends of the members.

The gates 59 comprise perforated plates that are mounted similar to the gates 55, being hung on pivot pins 60 that engage in recesses 61 in carrier plates 62. Like the gates 55, the gates 59 are mounted upon the sides of the carrier plates 62 toward the centers of the members 50, and may swing freely toward the centers of such members, the edges of the plates 62 serving as stops to prevent outward swinging of the gates. The gates 59 are preferably of insufficient length to reach the bottoms of the members 50, but are long enough to extend below the level at which the liquid is maintained so that floating ice will be stopped by them when flowing toward the ends of the tubes adjacent which the gates 59 are located.

The use of the perforated and solid gates mounted at opposite ends of the tubular members 50, and reversed in arrangement in the respective members, and swinging only toward the centers of the members, permits circulation of liquid through the system in one direction only, regardless of the surges or inclination of the car. It also permits ice to enter, but not to leave after entering the members 50, and the ice so trapped in the members serves to cool the brine directly without necessitating that it circulate to the ice and brine tanks to be cooled.

The enlarged heads 38 and the tubular members 50 also serve to provide space for a charge of ice much greater than could be contained in straight-walled tanks alone, and such overcharging may be resorted to without upsetting either the automatic liquid levelling provided by the siphons or the maintenance of the level after it has been adjusted, which results as above described.

This is due to the fact that the level of the liquid is above the bottoms 54 of the tubular structures 50 and the bottoms 39 of the enlarged heads 38, so that crushed ice additional to the normal charge may float above such bottoms. It will be apparent that a large quantity of crushed ice may be floated in a system such as that described, even though the depth of the brine in the heads 38 and tubular members 50 is no more than one or two inches. If chunks of too great volume to float in such a shallow liquid should get into the shallow part of the system, their melting would slightly lower the liquid level, but such lowering in a system of relatively great extent would not be appreciable.

The forces that disturb the level of the liquid in the system during hauling of the car, and by reason of which circulation is obtained, are due to side sway of the car, compression and recoil of the bolster springs, grades in the right of way, and changes in speed. The maximum vertical movement of a refrigerator car due to spring compression and recoil is from three and one-half to four inches, depending on the type of spring. The shocks to which a car in transit is subjected set up a regular rhythmic vibration, due to this compression and recoil, and in the system described, this vibration causes the columns of ice in the end tanks 36 to churn up and down, setting up a pulsation throughout the entire system and providing a regular circulation.

Railroad grades practically never exceed three per cent; grades of two per cent are uncommon; and grades of one percent are common. On a one per cent grade, a refrigerator car of standard length is approximately four inches out of level, this being sufficient to cause a flow of liquid from the high end to the low end. Surges through the tubular members 50 are caused by starting and stopping and changes of speed.

Side sway of a car changes the levels of the tanks and causes flow transverse of the car from the high to the low tank.

Any one of these forces operates to move liquid from one of the tanks to another. Since the gates of the tubular members 50 limit flow to a single direction through the system, the various forces tend to keep up a constant flow throughout the entire system. This circulation tends to keep the entire system at a uniform low temperature, and since all parts of the cargo space are relatively close to a portion of the refrigerating surface of the system, a maximum refrigerating effect is produced throughout the cargo space.

By way of example, a practical refrigerating system for a standard type refrigerator car may be constructed as follows: The tanks 36 are 74 inches high from the lowest points of the hopper bottoms to the top walls 41. The enlarged heads 38 are 10 inches deep and each has a bottom surface area of approximately 12 square feet. The tubular members 50 are 8 inches wide by 10 inches high and approximately 30 feet long. The vertical portions 37 of the tanks 36, below the bottoms of the enlarged heads 38 are 62 inches high and have respective capacities of 30.5 cubic feet.

In charging such a system, 1125 pounds of crushed ice and salt are charged into each tank 36, this representing a volume of about 25 cubic feet, or about 80 per cent of the volume of the lower portion of a tank. The siphon intake, to allow an ample safety margin, is spaced 9 inches below the tops of the tanks, and its highest point is spaced one inch below the level of such tops. This arrangement requires a raise of liquid of eight inches from the level of the siphon intake to start the siphon. When the liquid is at the level of the intake, a volume of about 73 cubic feet is needed to raise the liquid the required amount. This volume is equal to that of about 3275 pounds of ice. A charge of 4500 pounds of ice, divided among the tanks is ample to start the siphons, and when the liquid has been lowered to the level of the siphon intakes, the ice charges in the respective tanks will float free of the bottoms of such tanks and with about 5 inches of their height floating above the level of the liquid in the tanks, and about 6 inches above the bottoms of the enlarged heads and tubular members.

When the car is in transit, vibration and swaying will cause the top portion of the ice charge in a tank to break up, and since such ice is above the bottom of the enlarged head, it will spread into the head, and will be carried into the tubular member with which the head is connected. As the tops of the ice charges are broken up and drifted away, the lower parts of the charges will float up and their upper portions will be progressively broken up and the charges will continue to rise. This gradual raising of the ice charges and distribution of ice from the tanks has the desirable result of placing at least a large part of the ice that the system contains at a high level with relation to the cargo space, resulting in improved refrigeration as before mentioned. It is to be noted that this distribution of the ice at a high level is accomplished entirely without the necessity of charging a relatively large and shallow system by distributing crushed ice through it, which obviously would require considerable time and effort, but is done by reason of the character of the combination of the relatively shallow and high parts of the system with the deep ice and brine tanks that may be charged by a single rapid operation. The upstanding tanks at the ends of the car also provide for holding sufficient liquid to start the siphons when displaced by the ice charges.

A charge of 4500 pounds of ice in such a system will refrigerate a precooled car of standard construction for 96 hours in normal summer weather. The refrigeration period may be lengthened to 6 days by inserting an additional 2500 pounds of ice in the upper portions of the tanks 36 and in the heads 38. The melting of this additional ice will produce about 50 cubic feet of water, which will, when distributed over the approximately 92 square feet of bottom area of the system, raise the liquid level about 6 inches above its proper point, but still leaving a margin of about 3 inches before overflow in the siphons will occur. As a practical matter, it is not regarded as good practice to overcharge a system to such an extent, and as a matter of fact the charging of 2500 pounds of ice in addition to the normal charge requires such close packing as to be accomplished only with considerable difficulty. It is evident, however, that the system is capable of receiving considerable overcharge to lengthen the refrigeration period when required.

Figure 15 illustrates a novel method of precooling a car provided with a refrigerating system herein described, and Figures 15 and 16 disclose a novel device for accomplishing such method.

The method comprises charging the tanks 36 so that they contain a mixture of brine and ice, and in pumping the cold brine from one or more of the tanks and directing such brine into and along the tubular member that is connected with the tank from which the brine is pumped. The pumping sets up in a stationary car a circulation similar to that set up in a moving car, and the cold brine in flowing through the system absorbs heat from the cargo space, and quickly lowers the temperature to the required degree. The brine in circulating passes through the tanks and is chilled by the melting ice that the tanks contain.

This method of precooling is highly advantageous. It requires no expensive brine cooling and delivering plant, such as are required to precool cars of the hitherto commonly used types having upright tanks at their ends. It is also efficient and cars can be precooled in an entirely satisfactory manner by its employment.

To readily and inexpensively carry out the operation of precooling, a pumping device, illustrated in Figures 15 and 16 may be employed. The pumping device is advantageously mounted on a support 65 of suitable size and shape to engage in the hatchway 42 at the top of one of the tanks. A rotary pump 66 is mounted upon the under surface of the support 65 and has an intake line 67 that extends below the pump for insertion into a tank in the hatchway of which the device is engaged.

It is regarded as preferable to swing the solid gates 55 of the respective tubular members 50 at points spaced below the tops of the members, to provide spaces 68 through which the discharge line 69 of the pump may be inserted. In this way resistance to the flow delivered by the pump due to the gate is avoided.

The pump 66 is advantageously driven by a motor 70 that is mounted upon the upper surface of the support 65, by means of a belt 71 that passes through suitably located openings 72 in the support. Handles 73 are attached to the support to permit it to be easily handled in placing the device in or removing it from its operating position.

A refrigerating system of the type herein described has many advantages. The siphon arrangement permits quick reicing with automatic adjustment of the liquid level, and the location of the intake permits the adjustment to be to a point at which the level will remain constant during the melting of the ice. It also prevents accidental overflow or other escape of the brine from the tanks either to the interior of the car or to the right of way. The simplicity of the parts, and the ease with which the siphon may be installed in already existing sets of refrigerating tanks, enables the siphon arrangement to be used at low cost, either in newly constructed systems or in alterations of old systems.

The combination of brine tanks with the high tubular connecting members running longitudinally of the car provides a system capable of quick and easy charging, and at the same time provides for the desirable placing of the ice at a high level with relation to the cargo space. The enlarged heads of the tanks and the longitudinal tubular members also bring the refrigerant into proximity with the central portion of the car and thus produce a more efficient refrigeration. The high location of the longitudinal members also leaves the doors and the cargo space clear of obstruction.

The arrangement of the gates in the tubular members contributes to the efficiency of the system by causing a circulation of liquid through the system, and also by maintaining ice within the tubular members, whereby a uniform temperature prevails throughout the system.

From the foregoing it is thought that the construction, operation, and many advantages of the herein described invention will be apparent to those skilled in the art without further description, and it will be appreciated that changes in the size, shape, proportions and minor details may be resorted to without departing from the spirit of the invention as set forth in the appended claims.

I claim:

1. A refrigerating system for a refrigerator car, said system comprising a structure for containing ice and brine, and a siphon connected with the interior of the structure at a point spaced above the bottom of the structure a distance equal to substantially nine-tenths of the height of said structure, the highest point of the siphon being below the level of the top of the ice and brine containing structure.

2. A refrigerating system for a refrigerator car, said system comprising a structure for containing ice and brine and designed to receive a charge of ice of predetermined weight and enough brine to float the charge above the bottom of the structure, and means for automatically fixing the level of the brine when the structure is charged at a point spaced above the bottom sufficiently for the charge of ice to be floated, whereby the level of the liquid within the structure will remain substantially constant during the melting of the ice charge.

3. A refrigerating system for a refrigerating car, said system comprising a pair of spaced ice and brine tanks, a tubular member connecting said tanks at such a height that the level of the highest point reached by the liquid resulting from the melting of a charge of ice within the tanks passes through it, and a siphon connected with the tubular member at the said highest liquid level, the highest point of the siphon being below the level of the tops of the tanks.

4. A refrigerating system in accordance with claim 3, wherein the tanks are of proper size and height to contain charges of ice of definite weight and sufficient brine to float said charges free of the bottoms of the tanks, the tubular member that connects the tanks is arranged at a height above the bottoms of the tanks as great at least as the level reached by the surface of the brine when floating a full charge of ice.

5. A refrigerating system for a refrigerator car, said system comprising an upright ice and brine tank located adjacent an extremity of the car, said tank having a straight-sided lower portion that extends into the car a limited distance, and an enlarged head having a substantially flat bottom that extends into the cargo space and over a portion thereof, and means for fixing the level of the liquid in the tank when the latter is charged at a point above the bottom of the enlarged head and below the top of the tank.

6. A refrigerating system for a refrigerator car, said system comprising an ice and brine tank located adjacent an extremity of the car and including an upright, straight-sided lower portion that extends into the car a limited distance, and means for fixing the level of the liquid in the tank when the latter is charged at a point spaced above the bottom of the tank a distance equal to at least nine-tenths of the height of the tank and below the top of the tank, said tank having an enlarged head having a substantially flat bottom that extends into the cargo space and overlies a portion of it, said bottom being arranged at a level slightly below that at which the level of the liquid is fixed when the tank is charged.

7. A refrigerating system in accordance with claim 6, wherein the means for fixing the level of the liquid when the tank is charged comprises a siphon, said siphon having an intake within the tank arranged at a point spaced above the bottom of the tank a distance equal to at least nine-tenths of the height of the tank, the highest point of the siphon being below the level of the top of the tank.

8. A refrigerating system for a refrigerator car, said system comprising a pair of inverted L-shaped tanks arranged at the end of the car and spaced transversely thereof and each of said tanks comprising a vertical and a horizontal arm, a tubular connection extending between the tanks and connecting their interiors, the top of the connection being arranged at a level spaced above the bottoms of the tanks a distance equal to at least nine-tenths of the height of the tanks, and a siphon having an intake that opens through the top of the tubular connection and the highest point of which is below the level of the tops of the tanks, the horizontal arms of the tanks having bottoms that are below the level of the intake of the siphon, said bottoms extending beyond the vertical arms of the tanks and over portions of the cargo space of the car.

9. A refrigerating system for a refrigerator car, said system comprising an upright ice and brine tank arranged at each end of the car, a hollow tubular structure running longitudinally of the car between the tanks and connecting their interiors, said tubular structure being of sufficient size to permit passage of crushed ice the bottom of the tubular structure being below the level of the tops of the tanks, and means for automatically fixing the level of the liquid in the tanks when they are charged at a point above the bottom of the tubular structure and sufficiently below the top thereof to permit ice floating in the liquid to pass into said structure.

10. A refrigerating system for a refrigerator car, said system comprising an ice and brine containing structure at each end of the car provided with means operable to automatically fix liquid at a definite level within them, said structures extending transversely of the car, a hollow tubular structure extending along each sidewall of the car and adjacent the tops of the side walls, said tubular structures connecting the upper portions of the respective ice and brine containing structures adjacent their sides, and the tops and bottoms of said tubular structures being located respectively at levels sufficiently above and below the liquid level maintained to permit brine and floating ice to pass into them.

11. A refrigerating system in accordance with claim 10, wherein each of the tubular structures is provided with valve means arranged to permit liquid and ice to pass into such structure from either end, but to permit liquid to flow from said structure in one direction only, and to hold ice that is within the structure against passing out from either end, the valve devices of the respective tubular structures being arranged to permit liquid to pass from the respective structures in opposite directions.

12. A refrigerating system for a refrigerator car, said system comprising a shallow tank arranged at the top of the cargo space for holding brine and ice floating in the brine, and ice and brine containing means connected with the tank, said means extending below the bottom of the tank a distance sufficient to receive a charge of crushed ice of sufficient quantity to maintain the car at a desired temperature, and means for maintaining the level of liquid in the system at a point between the top and bottom of the shallow tank whereby the system may be charged by introducing the required charge into the ice and brine containing means at a single operation and such charge will form a column of ice the top of which will be maintained above the bottom of the shallow tank by the floating of the ice, and the top of the column will be broken up and floated into the tank by the motion of the car.

13. A refrigerating system in accordance with claim 12, wherein the shallow tank is arranged to form a circulating channel that surrounds at least a portion of the cargo space adjacent its top, such channel being interrupted by the ice and brine containing means.

14. A refrigerating system in accordance with claim 10, wherein each of the respective tubular structures is provided with a solid swinging gate arranged at the end of the structure for swinging only toward the center of the structure, the gates being located at opposite ends of the respective structures, and the tops of said gates being spaced below the tops of the structures sufficiently to permit passage of a hose above them for delivering a stream of liquid into and along the said tubular structures.

15. A refrigerator system for a refrigerator car, said system comprising a pair of spaced ice and brine tanks spaced transversely upon opposite sides of the longitudinal center of the car, a tubular member connecting said tanks at such a height above the bottoms of the tanks that a point spaced above the bottoms a distance equal to at least nine-tenths of the height of the tanks is level with its interior, and a siphon connected with the interior of the tubular member at a point spaced above the bottoms of the tanks a distance equal to at least nine-tenths of the heights of the tanks, said siphon being arranged substantially upon its horizontal center of the car, and its highest point being lower than the tops of the tanks.

16. A refrigerating system for a refrigerator car, said system comprising an ice and brine containing structure comprising a pair of tanks at each end of the car, said tanks being spaced upon opposite sides of the longitudinal center of the car, a hollow tubular structure extending along each side wall of the car adjacent the top of such side wall, said tubular structures respectively connecting the upper portions of the respective ice and brine tanks at such height that a point above the bottoms of said tanks a distance equal to at least nine-tenths of the height of the tanks lies between the bottoms of the tubular structure and the level of the top of the tanks, such point being upon the level at which it is desired to fix the surface of the liquid when the tanks are charged with ice, a pipe connecting the tanks at such a level that the desired liquid level passes through its interior, and a siphon connected with the pipe upon the desired liquid level, the topmost point of the siphon being below the level of the top of the tanks.

17. A refrigerating system for a refrigerator car, said system comprising an ice and brine containing structure at each end of the car, said structure extending transversely of the car, a hollow tubular structure extending along each sidewall of the car adjacent the tops of said sidewalls, said tubular structures connecting the upper portions of the respective ice and brine containing structures adjacent their sides, the bottoms of said tubular structures being located at a level lower than the tops of the ice and brine containing structures, each of said tubular structures being provided with a solid swinging gate and a perforated swinging gate, said gates being located respectively adjacent the opposite ends of the tubular structure, and said gates being arranged to swing open only toward the center of the structure, the perforated and solid gates of the respective tubular structures being arranged at relatively opposite ends of such structures.

GLENN C. GEORGE.